United States Patent
Han et al.

(10) Patent No.: US 10,868,627 B2
(45) Date of Patent: Dec. 15, 2020

(54) DEVICE AND METHOD OF CONFIGURABLE SYNCHRONIZATION SIGNAL AND CHANNEL DESIGN

(71) Applicant: Apple Inc., Cupertino, CA (US)

(72) Inventors: Seunghee Han, San Jose, CA (US);
Gang Xiong, Beaverton, OR (US);
Jong-Kae Fwu, Sunnyvale, CA (US);
Huaning Niu, Milpitas, CA (US);
Utsaw Kumar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,193

(22) Filed: May 9, 2019

(65) Prior Publication Data
US 2019/0334646 A1    Oct. 31, 2019

Related U.S. Application Data

(63) Continuation of application No. 15/564,859, filed as application No. PCT/US2015/067078 on Dec. 21, 2015, now Pat. No. 10,461,877.

(Continued)

(51) Int. Cl.
*H04J 3/06* (2006.01)
*H04J 11/00* (2006.01)
(Continued)

(52) U.S. Cl.
CPC ........ *H04J 11/0076* (2013.01); *H04L 5/0094* (2013.01); *H04L 27/2613* (2013.01);
(Continued)

(58) Field of Classification Search
CPC ... H04J 11/0076; H04J 3/0638; H04L 5/0094; H04L 5/0096; H04L 5/0048
See application file for complete search history.

(56) References Cited

U.S. PATENT DOCUMENTS

2010/0309797 A1    12/2010    Lindoff et al.
2013/0089065 A1*    4/2013    Koorapaty .......... H04W 56/002
                                                                370/330
(Continued)

FOREIGN PATENT DOCUMENTS

CN    101573899 A    11/2009
CN    101911796 A    12/2010
(Continued)

OTHER PUBLICATIONS

U.S. Appl. No. 15/564,859, filed Oct. 6, 2017, Device and Method of Configurable Synchronization Signal and Channel Design.
(Continued)

*Primary Examiner* — Bo Hui A Zhu
(74) *Attorney, Agent, or Firm* — Kowert, Hood, Munyon, Rankin & Goetzel, P.C.

(57) ABSTRACT

Devices and methods of using xSS are generally disclosed. A UE receives an xPSS with ($N_{rep}$) symbols each with a subcarrier spacing of K x a PSS subcarrier spacing and a duration of a PSS symbol/K. PSD subcarriers surround the xPSS and the ZC sequence is punctured to avoid transmission on a DC subcarrier. Guard subcarriers separate the xPSS and PSD when the ZC sequence is less than the occupied BW of the xPSS and at least one element in the ZC sequence is punctured for xPSS symbol generation otherwise. One or more xSSSs and xS-SCHs may follow the xPSS. The xSS may be omnidirectional, each having a same xPSS and different xSSS or xS-SCH or a different xPSS and same xSSS or xS-SCH or beamformed, each having different xPSSs and xSSSs or xS-SCHs or a same xPSS and different xSSS or xS-SCH.

20 Claims, 7 Drawing Sheets

Related U.S. Application Data

(60) Provisional application No. 62/159,059, filed on May 8, 2015, provisional application No. 62/163,696, filed on May 19, 2015.

(51) Int. Cl.
*H04L 27/26* (2006.01)
*H04L 5/00* (2006.01)
*H04W 72/04* (2009.01)

(52) U.S. Cl.
CPC ........ *H04L 27/2692* (2013.01); *H04J 3/0638* (2013.01); *H04L 5/0048* (2013.01); *H04L 5/0096* (2013.01); *H04W 72/042* (2013.01)

(56) References Cited

U.S. PATENT DOCUMENTS

| | | | |
|---|---|---|---|
| 2013/0122822 A1 | 5/2013 | Srinivasan et al. | |
| 2014/0064265 A1 | 3/2014 | Gheoghiu et al. | |
| 2014/0198676 A1 | 7/2014 | Han et al. | |
| 2017/0012753 A1* | 1/2017 | Kim | H04L 5/0053 |
| 2018/0091249 A1 | 3/2018 | Han et al. | |

FOREIGN PATENT DOCUMENTS

| | | |
|---|---|---|
| CN | 103765824 A | 4/2014 |
| CN | 107567698 A | 1/2018 |
| WO | WO-2009084931 A1 | 7/2009 |
| WO | WO-2014182837 A1 | 11/2014 |
| WO | WO-2016182602 A1 | 11/2016 |

OTHER PUBLICATIONS

"U.S. Appl. No. 15/564,859, Advisory Action dated May 8, 2019", 3 pgs.
"U.S. Appl. No. 15/564,859, Final Office Action dated Feb. 28, 2019", 10 pgs.
"U.S. Appl. No. 15/564,859, Non Final Office Action dated Sep. 21, 2018", 5 pgs.
"U.S. Appl. No. 15/564,859, Notice of Allowance dated Jun. 17, 2019", 5 pgs.
"U.S. Appl. No. 15/564,859, Response filed Apr. 24, 2019 to Final Office Action dated Feb. 28, 2019", 12 pgs.
"U.S. Appl. No. 15/564,859, Response filed May 28, 2019 to Final Office Action dated Feb. 28, 2019", 12 pgs.
"U.S. Appl. No. 15/564,859, Response filed Dec. 10, 2018 to Non Final Office Action dated Sep. 21, 2018", 12 pgs.
"European Application Serial. No. 15892052.0, Communication pursuant to Rule 164(1) EPC dated Nov. 26, 2018", 12 pgs.
"European Application Serial No. 15892052.0, Extended European Search Report dated Mar. 6, 2019", 11 pgs.
"International Application Serial No. PCT/US2015/067078, International Preliminary Report on Patentability dated Nov. 23, 2017", 7 pgs.
"International Application Serial No. PCT/US2015/067078, International Search Report dated Apr. 26, 2016", 8 pgs.
"International Application Serial No. PCT/US2015/067078, Written Opinion dated Apr. 26, 2016", 5 pgs.
"Japanese Application Serial No. 2017-552002, Voluntary Amendment filed on Jan. 4, 2018", (W/ English Claims), 21 pgs.
Office Action for Chinese Application No. 201580079616.5, dated Apr. 9, 2020, with English translation, 12 pgs.

\* cited by examiner

DEVICE AND METHOD OF CONFIGURABLE SYNCHRONIZATION SIGNAL AND CHANNEL DESIGN

PRIORITY CLAIM

This application is a continuation of U.S. patent application Ser. No. 15/564,859, filed Oct. 6, 2017, which is a U.S. National Stage Filing under 35 U.S.C. 371 from International Application No. PCT/US2015/067078, filed Dec. 21, 2015 and published in English as WO 2016/182602 on Nov. 17, 2016, which claims the benefit of priority to U.S. Provisional Patent Application Ser. No. 62/159,059, filed, May 8, 2015, and entitled "PRIMARY SYNCHRONIZATION SIGNAL DESIGN," and U.S. Provisional Patent Application Ser. No. 62/163,696, filed, May 19, 2015, and entitled "CONFIGURABLE SYNCHRONIZATION SIGNAL AND CHANNEL DESIGN," which are incorporated herein by reference in their entirety.

TECHNICAL FIELD

Embodiments pertain to radio access networks. Some embodiments relate to the synchronization of user equipment (UEs) in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments in particular relate to synchronization signals in 5G networks, including Primary Synchronization Signals (xPSS) and Secondary Synchronization Signal (xSSS) and a Secondary-Synchronization Channel (xS-SCH).

BACKGROUND

With the increase in different types of devices communicating over networks to servers and other computing devices, usage of 3GPP LTE systems has increased. In particular, as the number and complexity of UEs has grown, users have demanded extended functionality and enhanced and varied services and applications such as telephony, messaging services and video streaming among others. However, next generation systems may be targeted to meet vastly different and sometime conflicting performance constraints driven by the different services and applications. To address vastly diverse requirements, the next generation technology may evolve based on 3GPP LTE-Advanced with additional potential new Radio Access Technologies (RATs).

Among the numerous issues involved in designing 4 and 5G LTE systems is enabling synchronization of UEs with the network. To this end, with the increase in the types of UEs accessing network resources and for various purposes, it may be desirable to provide flexibility for synchronization signals in next generation networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
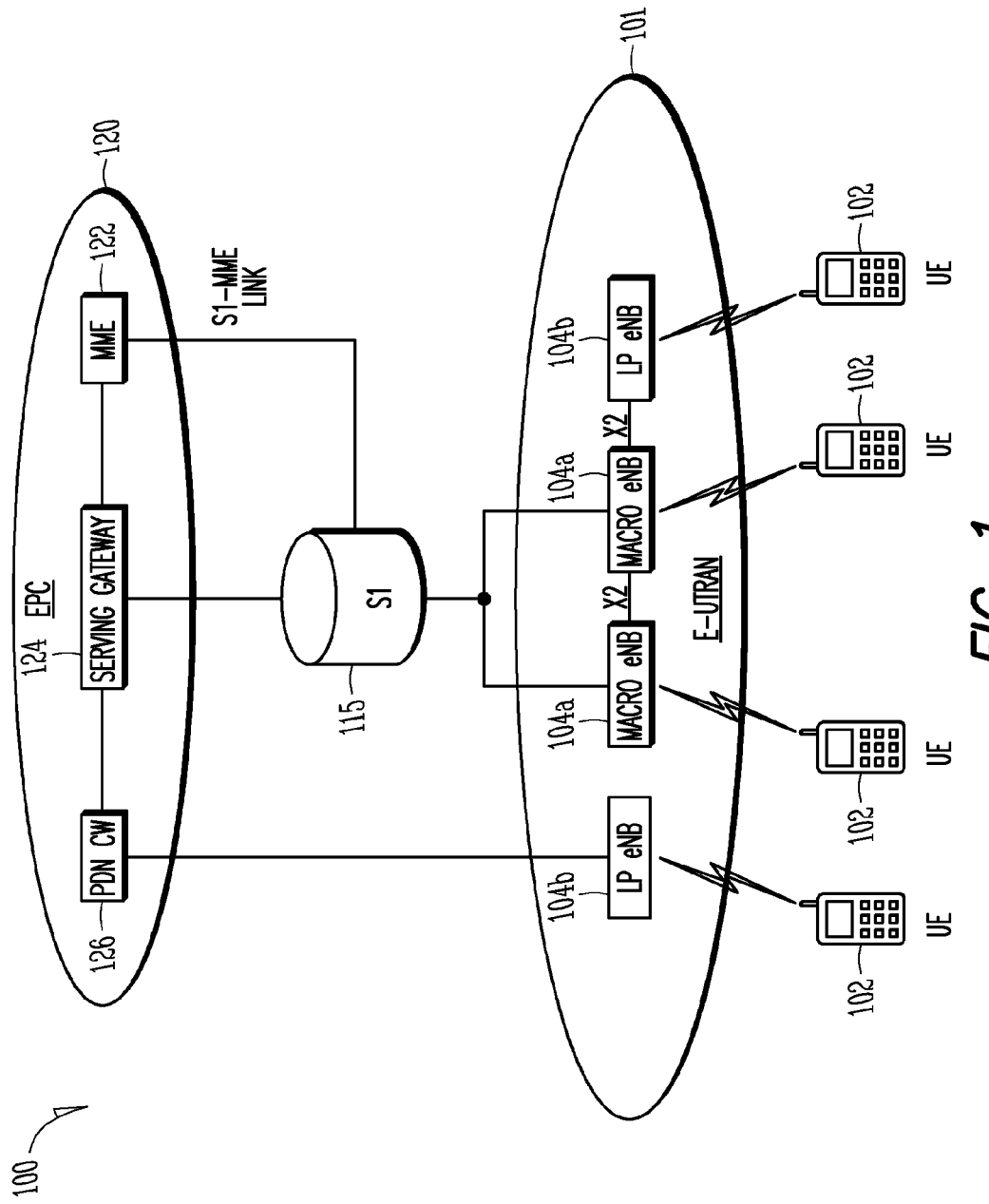
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the synchronization techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Communication over an LTE network may be split up into 10 ms frames, each of which may contain ten 1ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols) =168 resource elements.

Each OFDM symbol may contain a cyclic prefix (CP) which may be used to effectively eliminate Inter Symbol Interference, and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Periodic reference signaling messages containing reference signals may occur between the eNB and the UEs. The downlink reference signals may include cell-specific reference signal (CRS) and UE-specific reference signals. The CRS may be used for scheduling transmissions to multiple UEs, channel estimation, coherent demodulation at the UE and handover. Other reference signals may include a channel state information reference signal (CSI-RS) used for measurement purposes, and a Discovery Reference Signal (DRS) specific to an individual UE. CSI-RS are relatively sparse, occur in the PDSCH and are antenna dependent.

The Primary Synchronization Signal (PSS) and Secondary Synchronization Signal (SSS) may be used by the UE to identify the cell using the cell ID, the current subframe number, slot boundary, and duplexing mode. The PSS and SSS may be sent in the center 6 PRBs (1.08 MHz) of the system bandwidth used by the eNB 104a, 104b. The PSS and SSS may be transmitted from the eNB 104a, 104b in a broadcast to all UEs 102 in symbol periods 6 and 5, respectively, in each of subframes 0 and 5 of each radio frame with a normal CP. The PSS may be used for slot synchronization and carry one of 3 cell IDs in a group sequence; the SSS may be used for frame synchronization and carry one of 170 unique cell identifiers so that 510 unique combinations of cell ID and cell identifier exist in the LTE system. As the frequency location of the PSS may be a constant, the PSS may permit the UE 102 to synchronize to the network without any a priori knowledge of the allocated bandwidth using a correlation at the expected band to obtain the PSS/SSS.

Specifically, the PSS and SSS may be comprised of a sequence of length 62 symbols, mapped to the central 62 subcarriers around the Direct Current (D.C.) subcarrier, the subcarrier whose frequency would be equal to the RF center frequency of the UE 102. The PSS may be constructed from a frequency-domain Zadoff-Chu (ZC) sequence of length 63. The UE 102 may be able to obtain the physical layer cell ID and achieve slot synchronization after the detection of the PSS. The SSS sequences may be generated according to maximum length sequences (M-sequences), which can be created by cycling through every possible state of a shift register of length n. Detection of the PSS and SSS may enable time and frequency synchronization, provide the UE with the physical layer identity of the cell and the CP length, and inform the UE whether the cell uses FDD or TDD. After detection of the PSS and SSS, the UE 102 may be able to communicate with the eNB 104 to receive and decode the PDCCH and any PDSCH intended for the UE 102 and provide uplink transmissions to the eNB 104.

Two Synchronization channels may be defined for cell search. The Primary Synchronization channel (P-SCH) carries a primary code with a value 0-2 that indicates the cell ID within a cell ID group. The sequence to be transmitted on the PSS corresponding to one of the cell-IDs is generated from a frequency-domain ZC sequence, which results in 3 root indexes, one each for the 3 cell-IDs. The Secondary Synchronization channel (S-SCH) carries a secondary code with a value 0-167. This indicates the cell ID group, one from 168 possible groups. The UE 102 correlates the received signal with the variations and identifies the maximum correlation value to determine the value of the codes and obtain the Physical Cell ID of the cell and to be Radio Frame, Subframe and Slot aligned with the cell.

In some embodiments, with a non-calibrated antenna, beamformed PSS transmission may be used for eNB antenna training. For TDD systems with a calibrated antenna, omni-repeated PSS transmissions may be considered to further reduce the beamforming training overhead. When a beamformed PSS transmission is configured, during transmission of the PSS/SSS using beam scanning by the eNB 104, the UE 102 may perform a beam search and subsequently transmit an acknowledgment (ACK) to the eNB 104 with the optimal eNB transmission direction. The eNB 104 may respond with a directional transmission using the indicated transmission direction. The UE 102, having received the directional transmission may transmit to the eNB 104 an uplink physical random access channel (PRACH) using beam scanning. The eNB 104 may perform a beam search and subsequently transmit an ACK to the UE 102 with the optimal UE transmission direction. The UE 102, having received the ACK may respond with a transmission using the optimal UE transmission direction and the eNB 104 may perform receiver training.

When omni-repeated PSS transmission is configured for the eNB 104, during transmission of the PSS/SSS by the eNB 104, the UE 102 may perform course beamforming training and transmit a PRACH using a course sector sweep without providing feedback to the eNB 104. The eNB 104 may perform analog and digital beamforming training.

The above and other periodic messages thus not only provide information regarding the communication channel, but also enable tracking in time and/or frequency of communications with the UE. The uplink reference signals may include Demodulation Reference Signals (DM-RS), which may be used to enable coherent signal demodulation at the eNB. DM-RS may be time multiplexed with uplink data and transmitted on the fourth or third symbol of an uplink slot for normal or extended CP, respectively, using the same bandwidth as the data. Sounding Reference Signals (SRS) may be used by UEs with different transmission bandwidth to allow channel dependent uplink scheduling and may typically be transmitted in the last symbol of a subframe.

Figure 2:
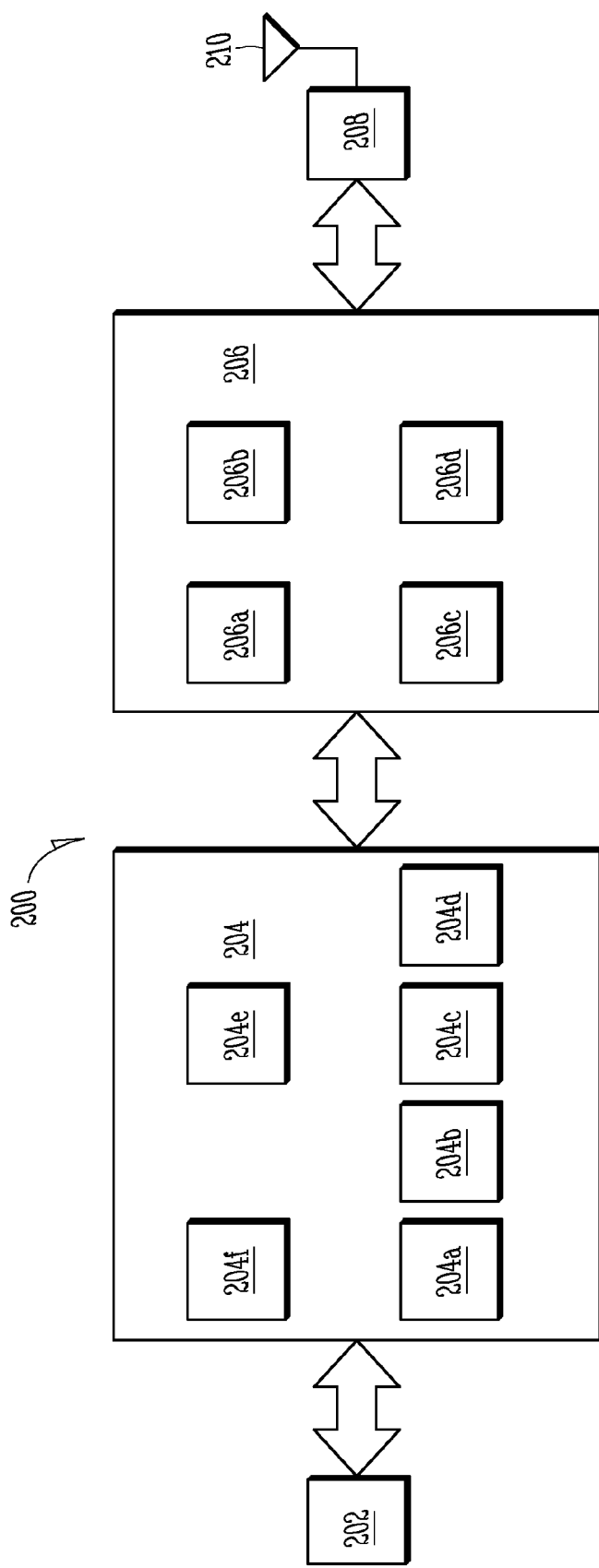
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLo). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
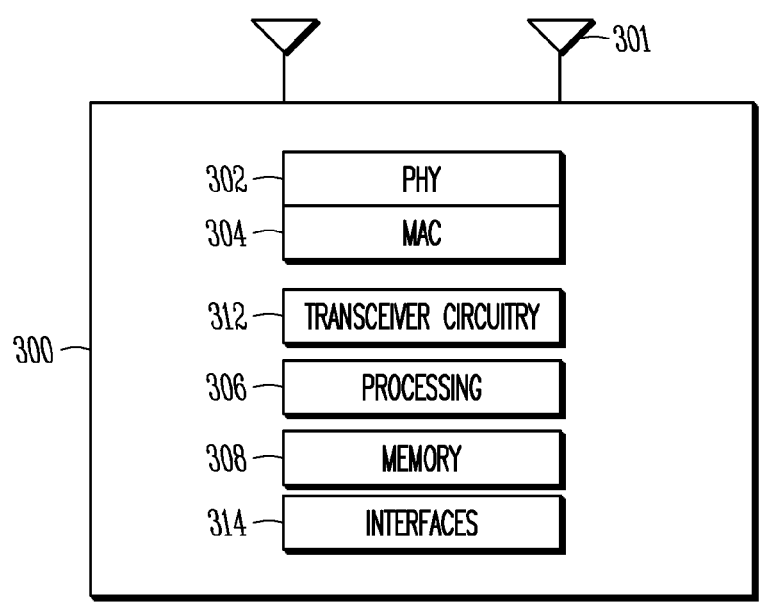
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
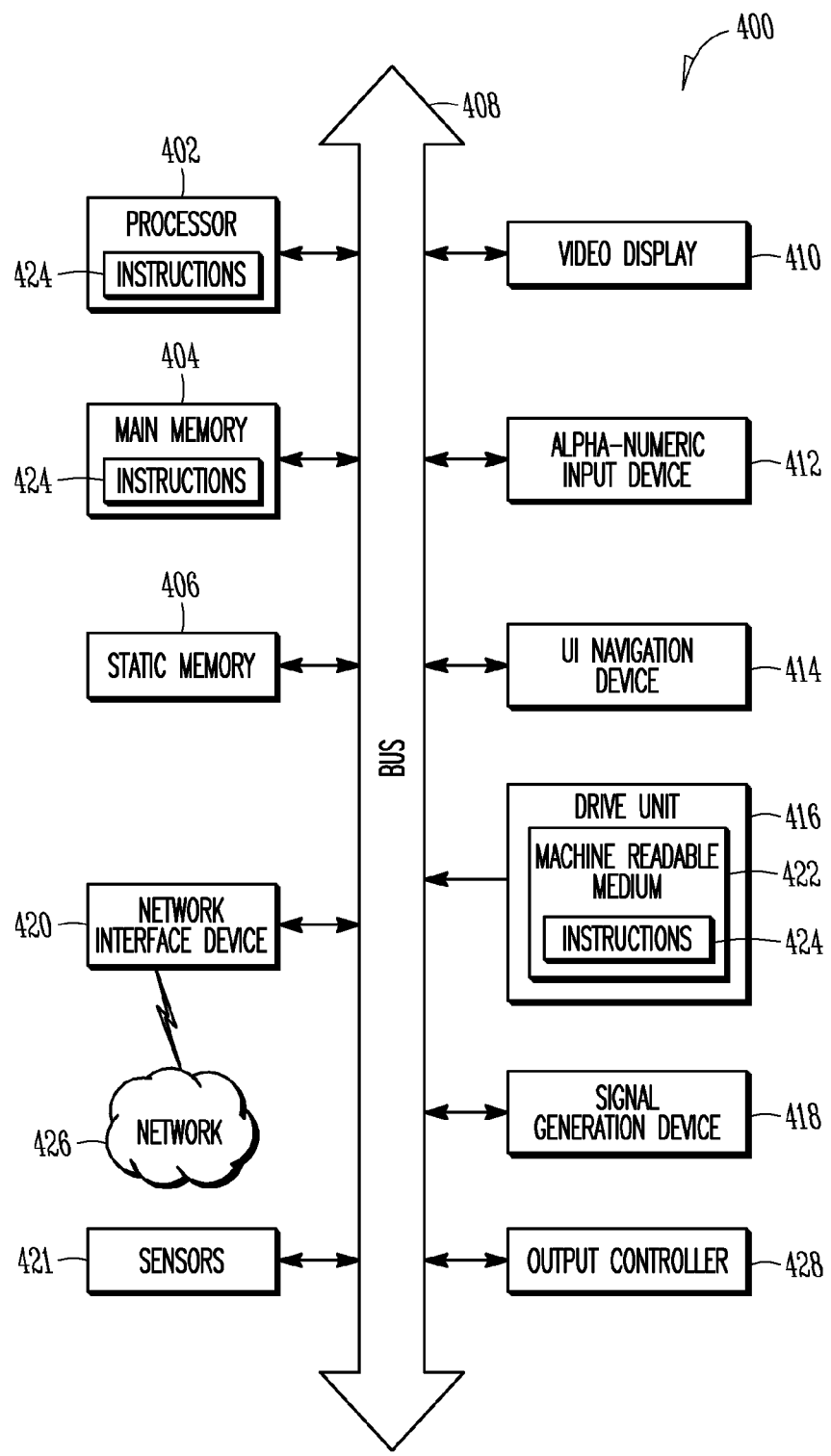
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

Figure 5:
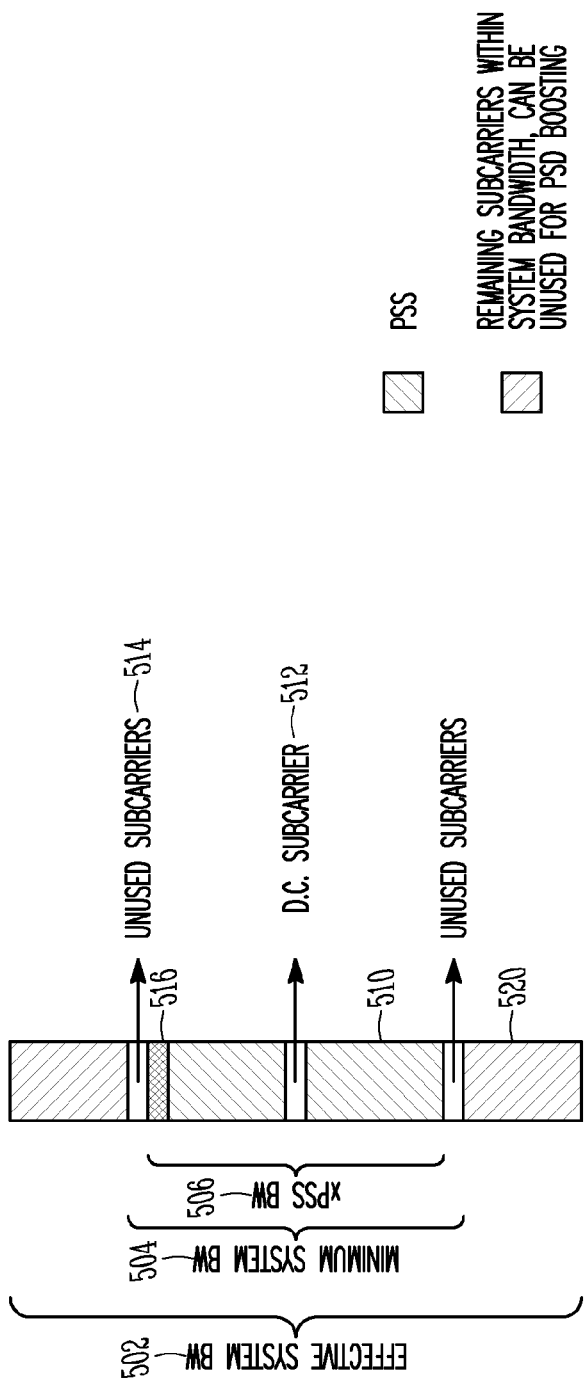
FIG. 5 illustrates a system bandwidth including a primary synchronization signal in accordance with some embodiments.

Methods of generating a next generation PSS (referred to herein as xPSS), as well as a repeated transmission scheme for the xPSS and a configuration of the xPSS transmission for a standalone or non-standalone system are described herein. FIG. 5 illustrates a system bandwidth including a primary synchronization signal in accordance with some embodiments. FIG. 5 illustrates an xPSS transmission within a minimum system bandwidth 504 of an effective system bandwidth 502. In general, the xPSS transmission 510 may support the minimum system bandwidth 504 as defined in a next generation system (e.g., a 5G system), which allows the UE to synchronize to the network without any a priori knowledge of the allocated bandwidth due to being disposed in a predetermined location in frequency and time. In some embodiments, the xPSS transmission bandwidth 506 may be less than the minimum system bandwidth 504 to minimize intercarrier interference. In some embodiments, the remaining subcarriers 520 within the system bandwidth 502 can be left unused for Power Spectral Density (PSD) boosting to improve the link budget for the xPSS transmission 510. The D.C. subcarrier 512 may be disposed at the center of the xPSS transmission. In some embodiments, unused subcarriers 514 may be disposed between the xPSS transmission 510 and the PSD subcarriers 520. In some embodiments, a cyclic extension 516 of a sequence (e.g. the Zadoff-Chu (ZC) sequence) forming the xPSS transmission 510 may be used at one end of the xPSS transmission 510. The cyclic extension 516 may be use at either end and may copy the ZC sequence at the other end of the xPSS transmission 510.

A number of parameters may be used to describe the xPSS transmission. These parameters include: minimum system bandwidth for the system ($BW_{min,sys}$), occupied bandwidth for the xPSS transmission ($BW_{PSS}$), subcarrier spacing for normal transmission ($\Delta f_{SC}$), subcarrier spacing for the xPSS transmission ($\Delta f_{PSS,SC}$), total number of subcarriers within the occupied bandwidth for xPSS transmission ($N_{PSS}$), the length of the ZC sequence ($N_{ZC}$), which can be an odd value or a prime number. Typically, subcarrier spacing for the xPSS transmission can be aggregated subcarriers for normal transmission, i.e., $\Delta f_{PSS,SC} = K \cdot \Delta f_{SC}$ where K is the aggregation level. The total number of subcarriers within the occupied bandwidth for xPSS transmission ($N_{PSS}$) may be indicated by, e.g., $$N_{PSS} = \left\lfloor \frac{BW_{PSS}}{\Delta f_{PSS,SC}} \right\rfloor \text{ or } N_{PSS} = \left\lceil \frac{BW_{PSS}}{\Delta f_{PSS,SC}} \right\rceil.$$

For instance, $BW_{PSS}$=18 MHz, $\Delta f_{PSS,sc}$=300 KHz and $N_{PSS}$=60

In some embodiments, one element of the ZC sequence may be punctured to avoid transmission on the D.C. subcarrier. In some embodiments, if the length of the ZC sequence ($N_{ZC}$) is less than the total number of subcarriers within the occupied bandwidth for xPSS transmission ($N_{PSS}$) within $BW_{PSS}$ 506, the unused subcarriers 514 at the edge of the $BW_{PSS}$ 506 can be left unused. That is, the subcarriers 514 surrounding the xPSS 506 to form the minimum system bandwidth 504 may be unused, providing a buffer between the PSD boosting subcarriers 520 and the xPSS 506. In this embodiment, the xPSS sequence may be generated as follows:

$$x_u(n) = \exp\left\{-\frac{j\pi u n(n+1)}{N_{ZC}}\right\}, n = 0, 1, \ldots, \left\lfloor \frac{N_{ZC}}{2} \right\rfloor - 1$$

$$\exp\left\{-\frac{j\pi u(n+1)(n+2)}{N_{ZC}}\right\}, n = \left\lfloor \frac{N_{ZC}}{2} \right\rfloor, \ldots, N_{ZC} - 2$$

where u is the root index, which can be fixed or defined as a function of physical cell identity or a virtual identity configured by higher layers (such as through an RRC message, e.g., an RRC Connection Reconfiguration message) either from the Primary Cell (Pcell) or the Secondary Cell (Scell). The Pcell may be the cell in which the UE either performs the initial connection establishment procedure or initiates the connection re-establishment procedure, or the cell indicated as the primary cell in a handover procedure. The Pcell may source non-access stratum (NAS) information such as security parameters for the UE. The PCell may operate on a primary frequency; each SCell may thus operate on a secondary frequency, which may be configured once an RRC connection is established and which may be used to provide additional radio resources.

Further, the mapping of the sequence to the resource elements for xPSS generation can be defined as follows:

$$a_k = x_u(n), n = 0, 1, \ldots, N_{PSS} - 2$$

$$k = n - \left\lfloor \frac{N_{ZC}}{2} \right\rfloor + \left\lfloor \frac{N_{PSS}}{2} \right\rfloor$$

where $a_k$ is the transmitted xPSS symbol on the kth subcarrier and k=0, 1, . . . , $N_{PSS}$–1. In addition the resource elements where $$k = 0, 1, \ldots, \left\lfloor \frac{N_{PSS}}{2} \right\rfloor - \left\lfloor \frac{N_{ZC}}{2} \right\rfloor, N_{ZC} - 1 - \left\lfloor \frac{N_{ZC}}{2} \right\rfloor + \left\lfloor \frac{N_{PSS}}{2} \right\rfloor \ldots, N_{PSS} - 1$$

may be reserved as guard subcarriers and may not be used for the transmission of the xPSS symbol.

In one example, for $BW_{min,sys}$=20 MHz, $BW_{PSS}$=18 MHz, $\Delta f^{SC}$=75 kHz, k=4, then the total number of subcarriers within the occupied BW for xPSS transmission, $N_{PSS}$=60. The ZC sequence length can be defined as $N_{ZC}$=57 and the xPSS symbol can be generated as follows:

$$x_u(n) = \exp\left\{-\frac{j\pi u n(n+1)}{57}\right\}, n = 0, 1, \ldots, 27$$

$$\exp\left\{-\frac{j\pi u(n+1)(n+2)}{57}\right\}, n = 28, \ldots, 55$$

and the mapping of the sequence to the resource elements for xPSS symbol can be defined as:

$$a_k = x_u(n), n = 0, 1, \ldots, 58$$

$$k = n + 2$$

where subcarriers k=0, 1, 58, 59 may be reserved as guard subcarriers and not used for the transmission of the xPSS symbol.

In some embodiments, when the length of ZC sequence is less than the number of subcarriers within the xPSS transmission bandwidth 506, a cyclic extension 516 of the ZC sequence may be employed for xPSS generation. Similarly, one element of the ZC sequence may be punctured for the D.C. subcarrier 512.

In this embodiment, the xPSS sequence may be generated as follows:

$$a_k = x_u(k \bmod(N_{ZC} - 1))$$

where $a_k$ is the transmitted xPSS symbol on the kth subcarrier and k=0, 1, . . . , $N_{PSS}$–1. In addition, $x_u(n)$ may be generated as follows:

$$x_u(n) = \begin{cases} \exp\left\{-\frac{j\pi u n(n+1)}{N_{ZC}}\right\} & n = 0, 1, \ldots, \left\lfloor \frac{N_{PSS}}{2} \right\rfloor - 1 \\ \exp\left\{-\frac{j\pi u(n+1)(n+2)}{N_{ZC}}\right\} & n = \left\lfloor \frac{N_{PSS}}{2} \right\rfloor, \ldots, N_{ZC} - 2 \end{cases}$$

where u is the root index, which can be fixed or defined as a function of physical cell identity or a virtual identity configured by higher layers either to from the Pcell or Scell.

In the above example, for $BW_{min,sys}$=20 MHz, $BW_{PSS}$=18 MHz, $\Delta f_{SC}$=75 kHz, k=4, then the total number of subcarriers within the occupied BW for xPSS transmission $N_{PSS}$=60. The the ZC sequence length can be defined as $N_{ZC}$=57 and the xPSS symbol can be generated as follows:

$a_k = x_u(k \bmod 56)$, where $$x_u(n) = \exp\left\{-\frac{j\pi u n(n+1)}{57}\right\}, n = 0, 1, \ldots, 29$$

$$\exp\left\{-\frac{j\pi u(n+1)(n+2)}{57}\right\}, n = 30, \ldots, 55$$

In some embodiments, when the length of ZC sequence is greater than or equal to the number of subcarriers within xPSS transmission bandwidth 506, one or more elements in the ZC sequence may be punctured for the xPSS symbol generation. Similarly, one element of the ZC sequence may be punctured for generation of the D.C. subcarrier 512. In this embodiment, the xPSS sequence may be generated as follows:

$a_k = x_u(k)$ where $a_k$ is the transmitted xPSS symbol on the kth subcarrier and k=0, 1, . . . , $N_{PSS}$−1. $x_u(n)$ may be generated as:

$$x_u(n) = \begin{cases} \exp\left\{-\frac{j\pi u n(n+1)}{N_{ZC}}\right\} & n = 0, 1, \ldots, \left\lfloor\frac{N_{PSS}}{2}\right\rfloor - 1 \\ \exp\left\{-\frac{j\pi u(n+1)(n+2)}{N_{ZC}}\right\} & n = \left\lfloor\frac{N_{PSS}}{2}\right\rfloor, \ldots, N_{PSS} - 1 \end{cases}$$

In the above example, for $BW_{min,sys}$=20 MHz, $BW_{PSS}$=18 MHz, $\Delta f_{SC}$=75 kHz, k=4, then the total number of subcarriers within the occupied BW for xPSS transmission $N_{PSS}$=60. The ZC sequence length can be defined as $N_{ZC}$=61 and the xPSS symbol can be generated as follows:

$a_k = x_u(k)$, where $$x_u(n) = \exp\left\{-\frac{j\pi u n(n+1)}{61}\right\}, n = 0, 1, \ldots, 29$$

$$\exp\left\{-\frac{j\pi u(n+1)(n+2)}{61}\right\}, n = 30, \ldots, 59$$

Turning to generation of a repeated xPSS signal in the time domain, in some embodiments, a larger subcarrier spacing can be employed to create a shortened OFDM symbol. Subsequently, the shortened xPSS can be repeated to improve the link budget. To keep the same or an integer number of sampling rate, it may be desirable to specify $N_{rep}=2^N$, where N>1 is an integer. In the above example, $\Delta f_{SC}$=75 kHz and the number of aggregated subcarriers K=8, then the aggregated subcarrier spacing can be given as $\Delta f'_{SC}=K \cdot \Delta f_{SC}$=600 kHz. The shortened symbol is the OFDM symbol duration/K and can may be repeated $N_{rep}$ times for the xPSS transmission.

In some embodiments, an interleaved Frequency Division Multiple Access (IFDMA) signal structure can be adopted to generate repeated xPSS signals in the time domain. In particular, xPSS symbols may be mapped in every K subcarriers in the frequency domain, while the remaining subcarriers are set to 0. This IFDMA structure with RePetition Factor (RPF) of $N_{rep}$ may create $N_{rep}$ repeated blocks in the time domain. Similar to the embodiments above, in some embodiments, $N_{rep}=2^N$ to keep the same or an to integer number for sampling rate where N>1 is an integer. In one example, when $N_{rep}$=2, xPSS symbols may be mapped to every even subcarrier, thereby creating 2 repeated blocks in the time domain.

Figure 6:
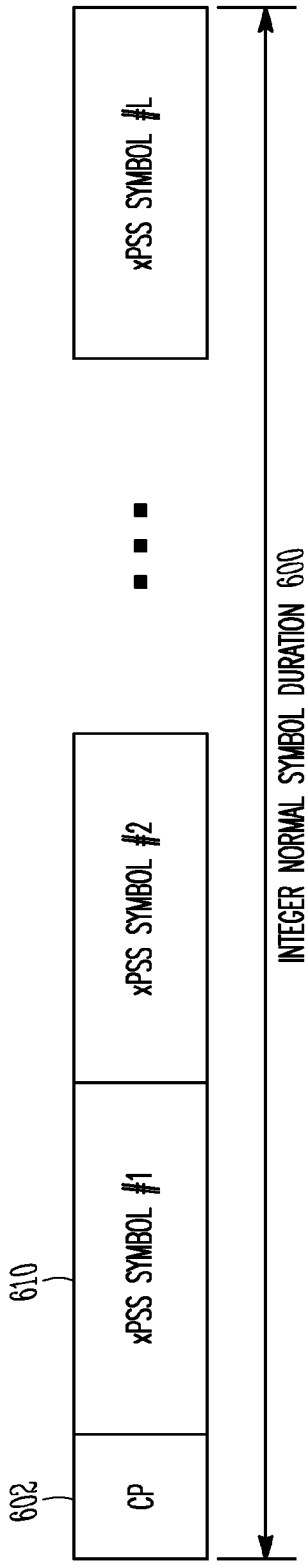
FIG. 6 illustrates a primary synchronization signal in accordance with some embodiments.

To improve the link budget and compensate the loss in the centimeter wave (cmWave) and millimeter wave (mmWave) bands, either a beamformed or repeated transmission of the xPSS signal may be used. FIG. 6 illustrates a primary synchronization signal in accordance with some embodiments. In some embodiments, a CP 602 may be inserted only at the beginning of an xPSS transmission 600 that contains one or more xPSS symbols 610. The length of the CP 602 can be determined based on the shortened symbol duration and total duration of the xPSS signal transmission 600, and whether an extended CP or a normal CP is used in the system. As shown, to accommodate for the CP all of the xPSS symbols 610 may be shortened by the same amount, or the xPSS symbols 610 may be shortened, if at all, by different amounts. In one embodiment of the latter case, only the first xPSS symbol 610 may be shortened.

In some embodiments, shortened xPSS symbols 610 may be used for each of the xPSS symbols 610. In these embodiments, a CP 602 may be inserted in each shortened xPSS symbol 610. This embodiment may be appropriate when the xPSS shortened symbol 610 is generated based on a number of aggregated subcarriers.

In embodiments in which a CP 602 is inserted in each shortened xPSS symbol 610, the number of aggregated subcarriers may be indicated by K. In the above example, $\Delta f_{SC}$=75 kHz, the symbol duration for normal transmission $T_{sym}$=13.3 μs, and the number of repetitions for the xPSS transmission $N_{rep}$=8. In various examples, for K=1 (the xPSS spans the same number of subcarriers as the data symbol), the xPSS may be 13.3 μs with a repetition that spans 8 OFDM symbols and a CP length of 7.5 μs; for K=8, the shortened xPSS symbol duration $T_{xPSS}=T_{sym}/K$=1.67 μs, the total xPSS repetition may span 1 OFDM symbol and the CP length may be 0.94 μs; and for K=4, the shortened xPSS symbol duration $T_{xPSS}$=3.33 μs, the total xPSS repetition may span 2 OFDM symbols and the CP length may be 1.88 μs.

For a non-standalone system, the information regarding the transmission of the xPSS transmission can be configured by higher layer signaling (e.g., a system information broadcast (SIB) or RRC signaling) and transmitted from the Pcell via UE-specific dedicated RRC signaling. The configuration of the xPSS transmission can include at least one of the following parameters: an indication of a beamformed or repeated xPSS transmission, an indication of PSD boosting for transmission of the xPSS transmission, periodicity, aggregation level and repetition level of the xPSS transmission, and an indication of normal or extended CP.

Specifically, the indication of beamformed or repeated xPSS transmission may also relate to whether FDD, TDD or TDD with uncalibrated antennas is used in the system. When PSD boosting for transmission of the xPSS transmission is indicated, the remaining subcarriers on the xPSS symbols within the system bandwidth may be left unused to improve the link budget of xPSS transmission. Further, either rate-matching or puncturing can be applied on the symbol(s) for transmission of data or control channels. The periodicity, aggregation level, and repetition level of the xPSS transmission may offer flexibility on the transmission of the xPSS transmission. Depending on possible UE capability on the xPSS detection, e.g., the number of antennas at the UE side, the eNB may adjust one or more of the parameters (the periodicity, aggregation level and repetition level) to allow efficient beamforming acquisition. The indication of normal or extended CP may indicate the application on the Scell. When this information is available at the UE side, faster synchronization and beamforming acquisition may be achieved, thereby reducing the UE power consumption.

In addition to the xPSS transmission, a configurable 5G Secondary Synchronization Signal (xSSS) transmission, 5G Secondary-Synchronization Channel (xS-SCH) transmission and channel design for a 5G system and a transmission method may be provided. In some embodiments, the general data structure for a synchronization channel may contain n synchronization signals (either an xPSS transmission or an xSSS transmission). In some embodiments, the synchronization signals may be followed by a data signal. In one example, two synchronization signals may be present—SS #0 can be an xPSS transmission and SS #1 can be an xSSS transmission (or xS-SCH transmission). In another example, only one synchronization signal may be present SS #0 can be an xPSS transmission and the data signal can be an xS-SCH transmission. In another example, two SSs may be present without the data signal SS #0 can be an xPSS transmission and SS #1 can be an xSSS transmission.

As above, three xPSS sequences may correspond to three physical layer identities within each group of cells. The SSS may carry the physical layer cell identity group, thereby permitting the UE to determine the cell identity using both values. The xSSS sequences include SSC1 and SSC2 codes, which have different cyclic shifts of a single length-31 M sequence. Each xSSS sequence may be constructed by interleaving, in the frequency-domain, two length-31 BPSK-modulated secondary synchronization codes. The xSSS codes may alternate between the first and second xSSS transmissions in each radio frame, thereby enabling the UE to determine the radio frame timing from a single observation of an xSSS transmission.

In some embodiments, the different xPSS codes/sequences may represent different beamforming indexes. While the beam may be transparent to the UE, the UE may have the detected sequences stored in memory to enable correlation of the sequence. After a UE transmits feedback, such as an ACK, containing the sequence to the eNB in response to receiving the xPSS transmission, the eNB may be able to determine which beam has been detected by a UE based on a feedback sequence unique to each beam and on the knowledge of the relationship between beam and sequence.

In some embodiments, the same omnidirectional xPSS transmission may be repeatedly transmitted at the eNB (using an omnidirectional antenna) to allow the UE to perform coherent or non-coherent combining over the repeated transmissions or to perform a beam search.

In some embodiments, the same xPSS transmission may be repeated at the eNB, but beamforming may be used rather than an omnidirectional transmission. In particular, different transmit beamforming may be applied by the eNB for each repetition to improve the link budget and compensate for the coverage loss. In this case, the xSSS transmission may be different in each repetition to allow the UE to obtain the transmit beamforming information and discriminate between the different xSSS transmissions. The UE, having obtained the xSSS transmission information, may transmit the xSSS transmission information to the eNB in an ACK or other feedback, containing the sequence, thereby permitting the eNB to determine which beam has been detected by a UE.

In some embodiments, different omnidirectional xPSS transmission signals may be transmitted over repeated transmissions by the eNB. Similar to the beamformed xPSS transmission, different root indexes may be used by the ZC sequence in generating the xPSS transmission for each repetition. To carry information for the physical cell identity, a limited set of root index patterns may be predefined in the specification. For instance, with 4 repetitions, the set of root indexes can be defined as follows: Set #1: {1, 2, 3, 4}; Set #2: {5, 6, 7, 8}; and Set #3: {9, 10, 11, 12}. The set of root indexes may not be limited to the above example, in which the number of root indexes in the sets is the same as the number of repetitions. In some embodiments, a greater number of root indexes may be used than repetitions. The root index used for a particular repetition may be randomly selected or may be selected in a continuous fashion for each repetition set. The manner in which the root index is selected may change between repetition sets. In some embodiments, the selection of the root indexes may depend on auto-correlation and cross-correlation properties of the resulting ZC sequence. The ZC sequences may be generated to provide robust timing synchronization performance in the presence of frequency offset. The xSSS transmission signal may be the same or different in each repetition depending on whether omnidirectional transmission or beamforming transmission is applied respectively. A summary of the synchronization signal variations and transmission types is provided in Table 1 below.

TABLE 1

| xPSS | xSSS or xS-SCH | Transmission |
| --- | --- | --- |
| Repeated, different | Repeated, Same | Omnidirectional |
| Repeated, Same | Repeated, Different | Beamforming, updated for each transmission |
| Repeated, Different | Repeated, Same | Omnidirectional |
| Repeated, Different | Repeated, Different | Beamforming |

In some embodiments, the physical cell ID information or partial physical cell ID information may be carried by sequence or a channel. In embodiments in which information is carried by a sequence, when X sequences are defined for an xSSS or xS-SCH channel transmission, each sequence may be used to indicate Y bits of information. For instance, if 4 sequences are defined for transmission, the use of sequence #1 may indicate information bit 00, the use of sequence #2 may indicate information bit 01, etc. Thus, the information embedded in the sequence used for the xSSS transmission may be extracted by the UE by correct detection of the particular sequence used for the xSSS transmission. As the total amount of information carried by the sequence may be limited, this may be beneficial when the size of the physical cell identity information in the xSSS transmission is relatively small. For instance, the xSSS transmission may carry partial information for the physical cell identity. As above, after detecting the xPSS transmission and xSSS transmission, the UE may be able to determine the physical cell identity. In some embodiments, the xSSS structure may be similar to that of an SSS.

In embodiments in which information is carried by a channel, information may be appended using the CRC and then encoded by channel coding used to generate the channel. Later, modulation is employed and subsequently, modulated symbols are mapped to the corresponding resource. In some embodiments, the information may be transmitted in a dedicated 5G synchronization channel (xS-SCH transmission). In some embodiments, the information may be carried by the sequences/codes described above. A detailed design including the data format and transmission scheme are described herein; some or all the parameters indicated may be included in different fields of the xS-SCH transmission. The parameters may include physical cell identity information, a beamforming index, a time index, a system bandwidth, a system frame number, TDD configuration information, and SIB1 scheduling information.

A physical cell identity field may contain partial or full information for the physical cell identity. For instance, while the xPSS transmission may carry 3 identities of the physical cell identity, the xS-SCH transmission may carry information for 168 groups.

A beamforming index field may contain the beamforming index. The beamforming index may be applied to an xS-SCH transmission instance so that a UE is able to determine which beamforming index has been used by the transmitter for that instance. Different beamforming indices may correspond to different precoding indexes, such that each beamforming index corresponds to a unique precoding index. For example, beamforming indices 0, 1, 2, 3 may correspond to precoding index w0, w1, w2, w3. In general, the mapping relationship between beamforming index and precoding index may be up to the eNB implementation. For example, the above beamforming indices 0, 1, 2, 3 may correspond to non-precoding (e.g. an omnidirectional, or quasi-omnidirectional transmission).

In some embodiments a single beamforming index may be detected by the UE; while in other embodiments multiple beamforming indexes may be detected by the UE. Whether one or more beamforming indexes are detected by the UE, the UE may provide the detected beamforming indexes to the eNB from the UE in a feedback signal. For example, two or more preferred beamforming index-based feedback signals may be used in scenarios in which the UE is located in a direction between two beams (i.e., the correlation for each beamforming signal meets or exceeds a predetermined threshold power).

A time index field may contain a time index. The time index may be, e.g., an OFDM symbol level index, slot number, subframe number, radio frame number, or any combination thereof. If the xS-SCH transmission is predetermined, that is always expected to occur, a time index counter may be used to specify which xS-SCH transmission was transmitted. As above, the UE may report one or multiple detected (or decoded) time indices. In some embodiments, the eNB may autonomously choose a relationship between the time index and beamforming index, one or both of which may be reported by the UE as above. The beamforming information may thus be transparent to the UE.

A system bandwidth field may indicate the 5G system bandwidth. A system frame number field that may indicate partial or full information of the system frame number. In some embodiments, the system frame number field and the time index field may be combined. A TDD configuration field may contain TDD configuration information. The TDD configuration field may allow dynamic control of downlink and uplink traffic. Scheduling information of SIB1 may be contained in a SIB scheduling field. The SIB scheduling field may contain the scheduling information in the time and frequency domain, e.g., periodicity and occasion of SIB1 transmissions.

A Cyclic Redundancy Check (CRC) may be appended to the payload of the xS-SCH transmission. In various embodiments, 8, 16 or 24 parity check bits may be calculated based on the payload size. As specified in section 5.1.1 in TS 36.212 [2], one of the generator polynomials $g_{CRC8}(D)$, $g_{CRC16}(D)$, $g_{CRC24A}(D)$, and $g_{CRC24B}(D)$ may be adopted for the xS-SCH transmission.

Either tail biting convolutional codes (TBCC) or turbo code (TC) in the LTE specification may be used for channel coding of the xS-SCH transmission. As TBCC outperforms TC when the payload size is relatively small (e.g. <100 bits), it may be more beneficial to reuse the existing TBCC for the xS-SCH transmission. After the channel coding process has been completed, rate matching may be performed to fill out the available resource elements allocated for the xS-SCH transmission. After the channel coding and rate-matching, scrambling may be performed to randomize the interference. In particular, the scrambling sequence count may be initialized as a function of the partial physical cell identity information:

$$c_{init} = f(N_{ID}^{(xPSS)})$$

where $N_{ID}^{(xPSS)}$ is the partial physical cell identity information carried in the xPSS transmission. The use of a scrambling sequence may ensure low cross correlation between sequences used in different cells and the interference.

To ensure robust reception of the xS-SCH transmission, either Binary Phase-Shift Keying (BPSK) or Quadrature Phase-Shift Keying (QPSK) may be used for modulation. Further, different waveform or multiple access schemes may be used for the xS-SCH transmission. Examples of these include Single-Carrier Frequency-Division Multiple Access (SC-FDMA), OFDMA, Filter Bank Multicarrier (FBMC), or Universal Filtered Multi-Carrier (UFMC). To enable efficient receiver processing at the UE, the same antenna port may be applied for the transmission of xPSS transmission and xS-SCH transmission. In this case, the UE may acquire the beamformer information from the xPSS transmission and apply this information for the reception of the xS-SCH transmission.

In various embodiments, the xPSS transmission and one of xSSS transmission and xS-SCH transmission may be multiplexed in a frequency-division multiplexing (FDM), time-division multiplexing (TDM), or code division multiplexing (CDM) manner. When the xS-SCH transmission is transmitted, to allow coherent detection of the xS-SCH transmission, a predetermined set of pilot symbols may be inserted in the OFDM symbols that are allocated for the xS-SCH transmission.

An eNB may have full control of one or more of the xPSS, xSSS and xS-SCH transmissions to enable configurable and opportunistic transmission of the synchronization signal or channel. Depending on the data traffic in the cell, the eNB may dynamically adjust the on/off pattern or overhead of the xPSS and xSSS or xS-SCH transmission.

The UE may attempt to decode and detect the xPSS and xSSS transmission and/or xS-SCH transmission. The detection and decoding may be based on threshold detection or CRC checking. In one example, the xPSS transmission and xSSS transmission or xS-SCH transmission may be fully loaded. This is to say that different cells may simultaneously transmit such that the xPSS transmission and xSSS transmission or xS-SCH transmission from different cells may overlap.

Figure 7:
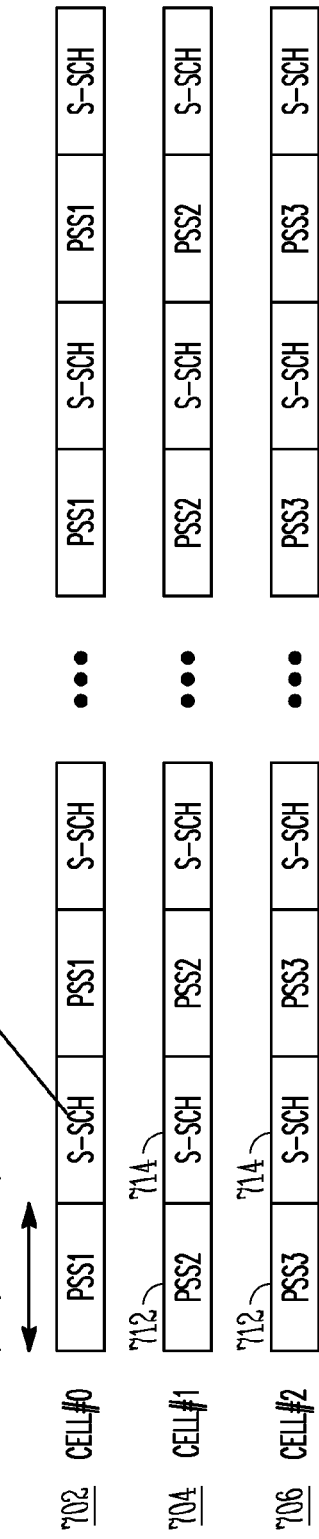
FIG. 7 illustrates a fully loaded synchronization signal and channel in accordance with some embodiments.

FIG. 7 illustrates a fully loaded synchronization signal and channel in accordance with some embodiments. As shown in FIG. 7, the eNB may send an xPSS transmission and xSSS transmission 712 (shown as an xPSS transmission for convenience) or xS-SCH transmission 714 using several cells 702, 704, 706. The transmission of the xPSS transmission and xSSS transmission 712 and/or xS-SCH transmission 714 may collide (or overlap) among the cells 702, 704, 706 during the repetition, as shown being fully loaded. As shown in FIG. 7, for example each of the xPSS transmissions 712 collide among the cells 702, 704, 706 and each of the xS-SCH transmission 714 transmissions collide during the repetition. The cells 702, 704, 706 may transmit different xPSS transmission sequences in the same time instances to permit a UE to distinguish among the xPSS transmission and xSSS transmission or xS-SCH transmissions 712, 714. For example, cell #0 702 may transmit xPSS 1, cell #1 704 may transmit xPSS 2 and cell #2 706 may transmit xPSS transmission3. The duration of the xPSS transmission 712 transmission may be measured in OFDM symbols, slots, subframes or frames, for example. The xS-SCH transmission 714, as above, may include, among others, cell ID, a time index, and a subframe and/or slot number.

Figure 8:
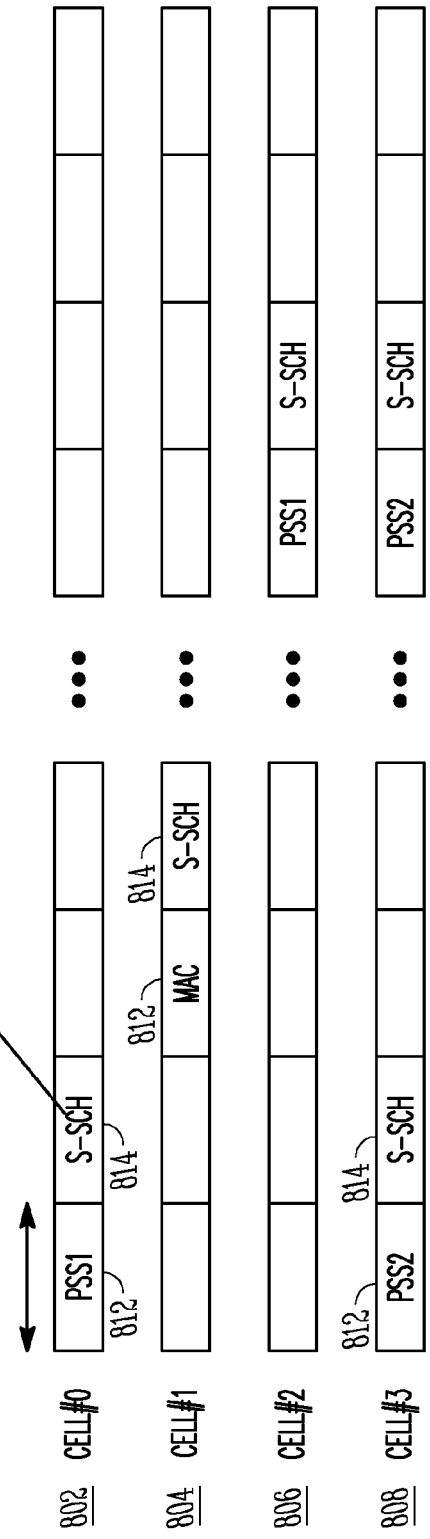
FIG. 8 illustrates a synchronization signal and channel transmission in accordance with some embodiments.

FIG. 8 illustrates a synchronization signal and channel transmission in accordance with some embodiments. In FIG. 8, the eNB may dynamically adjust the on/off pattern for the transmission of the synchronization signal or channel among the cells. This may permit the eNB to control whether or not xPSS transmission and xSSS transmission or xS-SCH transmissions 812, 814 overlap among the cells 802, 804, 806. This may also permit the eNB to control the interference avoidance from the different synchronization signals from the different cells (transmission points) by sending the signals on the different time locations. When the transmission of the synchronization signal (xPSS transmission and xSSS transmission) or synchronization channel (xS-SCH transmission) does not collide (i.e., do not overlap temporally) among the cells 802, 804, 806, the same xPSS transmission sequence (xPSS 1) may be transmitted by the eNB in the cells 802, 804, 806.

In some embodiments, the eNB may control the transmissions such that no collisions occur among the cells 802, 804, 806. In some embodiments, the eNB may control the transmissions such that some collisions occur. As shown in FIG. 8, the transmission of the xPSS transmission and xSSS transmission 812 or xS-SCH transmission 814 may collide between cells 802 and 808. In this case, cells 802 and 808 may transmit different xPSS transmission sequences, respectively as shown xPSS 1 and xPSS 2, to permit a UE receiving one or both of the xPSS transmission and xSSS transmissions 812 to distinguish among the xPSS transmission and xSSS transmissions 812. In some embodiments, the xPSS transmission and/or xSSS transmissions 812 may be different among the cells 802, 804, 806 despite no collisions occurring between these cells 802, 804, 806.

Figure 9:
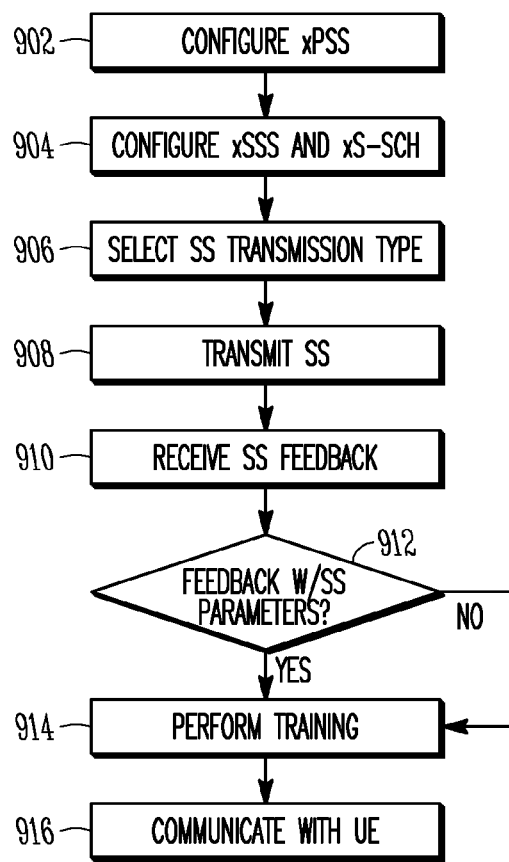
FIG. 9 illustrates a flowchart of synchronization in accordance with some embodiments.

FIG. 9 illustrates a flowchart of synchronization in accordance with some embodiments. The eNB shown in any of FIGS. 1-4 may employ the flowchart shown in FIG. 9, with the UE of FIGS. 1-4 employing similar operations. At operation 902, the eNB may configure the xPSS transmission and transmit this information to the UE. The information may be configured and transmitted from the Pcell via UE-specific dedicated RRC signaling. The configuration of the xPSS signal may include at least one: an indication of whether a beamformed or repeated xPSS transmission is being used, an indication of PSD boosting for transmission of the xPSS transmission is being used, an indication of whether normal or extended CP is being used, and periodicity, aggregation level and repetition level of the xPSS transmission.

The xPSS transmission bandwidth may be less than the minimum system bandwidth to minimize intercarrier interference. The remaining subcarriers within the system bandwidth may be used for PSD boosting. A D.C. subcarrier may be disposed at the center of the xPSS transmission. If the length of the ZC sequence is less than the total number of subcarriers within the occupied bandwidth for xPSS transmission, the unused subcarriers may be guard subcarriers disposed between the xPSS transmission and the PSD subcarriers. In some embodiments, a cyclic extension of the ZC sequence may be used at one end of the xPSS transmission. If the length of ZC sequence is greater than or equal to the number of subcarriers within xPSS transmission bandwidth, one or more elements in the ZC sequence may be punctured for the xPSS symbol generation.

The xPSS transmission may include a plurality of xPSS symbols. A cyclic prefix may be located in the front of every xPSS symbol or only in the front of the first xPSS symbol. Each xPSS symbol may occupy a number of aggregated subcarriers and have a length that is inversely proportional to the number of aggregated subcarriers. Alternatively, the xPSS transmission may have an IFDMA signal structure in which the xPSS symbols are mapped every K subcarriers in the frequency domain. The xPSS transmission may be repeated K times.

Having configured the xPSS and transmitted this information to the UE, the PCell eNB may at operation 904 configure the xSSS and/or xS-SCH transmissions. The general data structure may contain a predetermined number of xPSS and one of an xSSS transmissions or an xS-SCH transmission.

The eNB may, in operation 904, construct the xSSS sequence interleaving, in the frequency-domain, two length-31 BPSK-modulated secondary synchronization codes. The eNB may construct the synchronization structure for repeated omnidirectional or beamformed transmission. For omnidirectional transmission the xSSS transmissions may remain the same or different and the xPSS transmissions may be the same (e.g., to allow the UE to perform coherent or non-coherent combining over the repeated transmissions) or may be different to allow the UE to differentiate among the repetitions.

Similarly, for beamformed transmission, the instances of the repeated xSSS transmissions may be different and the instances of the repeated the xPSS transmissions may be the same or may be different. The differences between the beamformed transmission instances may permit the UE to determine which beamformed transmission has been detected. The xSSS transmission may contain partial physical cell identity information embedded in a sequence. The xS-SCH transmission may contain one or more of the physical cell identity information, beamforming index, time index and/or system frame number, system bandwidth, TDD configuration information and SIB1 scheduling information. The xS-SCH transmission may contain a CRC appended to the payload of the xS-SCH transmission.

At operation 906, the eNB may broadcast the synchronized signal at the predetermined time and in the predetermined subbands. As above, the broadcast may be repeated or beamformed, dependent on the structure of the transmission. The eNB may transmit in different cells such that one or more of the xPSS and xSSS/or xS-SCH overlap, in which case different sequences may be transmitted for each of the same overlapping synchronization signal. If neither the xPSS nor xSSS/or xS-SCH overlaps between cells, the same sequences may be used among the cells.

At operation 908, the eNB may receive feedback transmitted by the UE. The feedback may be an ACK signal or physical random access signal (PRACH) indicating that the UE has received the synchronization transmissions.

At operation 910, the eNB may determine whether or not the feedback contains synchronization parameters. The synchronization parameters may include xPSS, xSSS and/or xS-SCH information and may be used, as above, to determine the beamforming index or the repetition received by the UE. The parameters in the feedback may include, for example, one or more of one or multiple beamforming indexes and a time index and/or system frame number.

If the eNB determines at operation 912, that the feedback contains beamforming information, the eNB may at operation 914 perform beamforming training. Multiple transmit antennas at the eNB may adjust the overall transmission beam direction by applying different phase shifts to the signals to be transmitted on the different antennas. The adjustments may be based on the UE feedback.

Whether or not beamforming is used, at operation 916, the eNB may continue to communicate with the UE. For example, after synchronization via the xSS, the eNB may transmit a PDCCH and PDSCH intended for the UE after the UE has been synchronized with the eNB. The UE may similarly transmit a PUCCH and PUSCH to the eNB.

Example 1 is an apparatus of user equipment (UE) comprising: a transceiver arranged to communicate with an evolved NodeB (eNB); and processing circuitry arranged to: configure the transceiver to receive a primary synchronization signal (xPSS) transmission and one of a secondary synchronization signal (xSSS) and a synchronization channel (xS-SCH) transmission after the xPSS transmission, comprising one of: a plurality (Nrep) of xPSS symbols each comprising an xPSS subcarrier spacing an integer times a PSS subcarrier spacing and an xPSS duration the integer divided by a PSS duration, and an Interleaved Frequency Division Multiple Access (IFDMA) structure comprising sets of xPSS symbols separated by non-xPSS symbols; obtain a physical layer cell identification and achieve synchronization with the eNB using the xPSS transmission; and configure the transceiver to communicate with the eNB after synchronization is achieved with the eNB.

In Example 2, the subject matter of Example 1 optionally includes that the xPSS transmission comprises one of: a plurality (Nrep) of xPSS symbols each comprising an xPSS subcarrier spacing of K times a PSS subcarrier spacing of a PSS symbol and an xPSS duration of a PSS duration of the PSS symbol divided by K, where Nrep is an integer greater than 1, and an IFDMA structure to generate repeated xPSS transmission symbols in a time domain, the xPSS symbols mapped to every K subcarriers in a frequency domain and remaining subcarriers are set to 0, where $K=2^N$ and N is an integer greater than 1.

In Example 3, the subject matter of any one or more of Examples 1-2 optionally include that the xPSS transmission comprises a bandwidth less than a minimum system bandwidth, a cyclic extension of a Zadoff-Chu (ZC) sequence forming the xPSS transmission is disposed at one end of the xPSS transmission, and an element of the ZC sequence is punctured to avoid transmission on a Direct Current subcarrier disposed at a center of the xPSS transmission.

In Example 4, the subject matter of any one or more of Examples 1-3 optionally include that the xPSS transmission comprises a bandwidth less than a minimum system bandwidth, within the minimum system bandwidth, Power Spectral Density (PSD) subcarriers are employed for PSD boosting surround subcarriers of the xPSS transmission, a length of a Zadoff-Chu (ZC) sequence (NZC) that forms the xPSS transmission is less than a total number of subcarriers within an occupied bandwidth of the xPSS transmission (NPSS), and guard subcarriers disposed between the xPSS transmission and the PSD subcarriers remain unused between the PSD subcarriers and the xPSS transmission.

In Example 5, the subject matter of any one or more of Examples 1-4 optionally include that the xPSS transmission comprises a bandwidth less than a minimum system bandwidth, within the minimum system bandwidth, Power Spectral Density (PSD) subcarriers are employed for PSD boosting surround subcarriers of the xPSS transmission, a cyclic extension of a Zadoff-Chu (ZC) sequence that forms the xPSS transmission is disposed at one end of the xPSS transmission, and a length of the ZC sequence (NZC) is less than a total number of subcarriers within an occupied bandwidth of the xPSS transmission (NPSS), and guard subcarriers disposed between the xPSS transmission and the PSD subcarriers remain unused between the PSD subcarriers and the xPSS transmission.

In Example 6, the subject matter of any one or more of Examples 1-5 optionally include that the xPSS transmission comprises a bandwidth less than a minimum system bandwidth, within the minimum system bandwidth, Power Spectral Density (PSD) subcarriers are employed for PSD boosting surround subcarriers of the xPSS transmission, a length of the Zadoff-Chu (ZC) sequence (NZC) is at least a total number of subcarriers within an occupied bandwidth of the xPSS transmission (NPSS), at least one element in the ZC sequence is punctured for xPSS transmission symbol generation, and an element of the ZC sequence is punctured to avoid transmission on a Direct Current subcarrier disposed at a center of the xPSS transmission.

In Example 7, the subject matter of any one or more of Examples 1-6 optionally include that one of: the xPSS transmission comprises a bandwidth less than a minimum system bandwidth, a cyclic prefix (CP) is disposed in a first of the xPSS symbols, remaining xPSS transmission symbols in the xPSS transmission are free from the CP, a length of the CP is based on the xPSS duration, a total duration of the xPSS transmission, and which of an extended CP and a normal CP is used, and a CP is disposed in each of the xPSS symbols, a length of the CP based on the xPSS duration, a total duration of the xPSS transmission, and which of an extended CP and a normal CP is used.

In Example 8, the subject matter of any one or more of Examples 1-7 optionally include that the processing circuitry is further arranged to: configure the transceiver to receive information regarding the xPSS transmission from a primary cell (Pcell) via UE-specific dedicated Radio Resource Control (RRC) signaling, the information including at least one of an indication of whether the xPSS transmission is one of a beamformed and a repeated xPSS transmission, an indication of whether Power Spectral Density (PSD) boosting is being used for the xPSS transmission, an indication of whether a cyclic prefix (CP) is used for the xPSS transmission and a type of the CP, and a periodicity, an aggregation level (K) and a repetition level of the xPSS transmission.

In Example 9, the subject matter of any one or more of Examples 1-8 optionally include that the processing circuitry is further arranged to: configure the transceiver to consecutively receive a plurality of xPSS transmissions and one of an xSSS and an xS-SCH transmission after the xPSS transmissions.

In Example 10, the subject matter of any one or more of Examples 1-9 optionally include that the processing circuitry is further arranged to: configure the transceiver to receive a plurality of consecutive synchronization instances, each synchronization instance comprising an xPSS transmission and a secondary synchronization signal (xSSS) transmission and being free from a synchronization channel (xS-SCH) transmission.

In Example 11, the subject matter of any one or more of Examples 9-10 optionally include that the synchronization instances comprise one of: omnidirectional signals each comprising one of: a same xPSS transmission and a different one of xSSS and xS-SCH transmission, and a different xPSS transmission and a same one of xSSS and xS-SCH transmission, and beamformed signals each comprising one of: a same xPSS transmission and a different one of xSSS and xS-SCH transmission, and a different xPSS transmission and a different one of xSSS and xS-SCH transmission.

In Example 12, the subject matter of any one or more of Examples 1-11 optionally include that at least partial physical cell information is embedded in a sequence used for the one of the xSSS transmission and xS-SCH transmission, and the processing circuitry is further arranged to extract the at least partial physical cell information by correctly determining the sequence.

In Example 13, the subject matter of any one or more of Examples 1-12 optionally include that the xPSS transmission and the at least one of a secondary synchronization signal (xSSS) transmission and a synchronization channel (xS-SCH) transmission are multiplexed in one of a Frequency Division Multiplexing (FDM), Time Division Multiplexing (TDM) and Code Division Multiplexing (CDM) manner.

In Example 14, the subject matter of any one or more of Examples 1-13 optionally include further comprise an antenna configured to provide communications between the transceiver and the eNB.

Example 15 is an apparatus of an evolved NodeB (eNB) comprising: an interface configured to communicate with a user equipment (UE); and processing circuitry configured to, for each cell of a plurality of cells served by the eNB: configure the transceiver to transmit a plurality of primary synchronization signal (xPSS) transmissions and one of a secondary synchronization signal (xSSS) and a synchronization channel (xS-SCH) transmission after the xPSS transmission within a subframe for the cell, each xPSS transmission comprising one of an omnidirectional xPSS transmission and a beamformed xPSS transmission; and configure the transceiver to communicate with the UE after transmission of the xPSS transmissions.

In Example 16, the subject matter of Example 15 optionally includes that the processing circuitry is further configured to: configure the transceiver to transmit a plurality of omnidirectional synchronization signal (xSS) transmissions and a beamformed xSS transmissions within the subframe that each omnidirectional xSS transmission comprises one of: a same xPSS transmission and a different one of xSSS and xS-SCH transmission, and a different xPSS transmission and a same one of xSSS and xS-SCH transmission, and beamformed signals each comprising one of: a same xPSS transmission and a different one of xSSS and xS-SCH transmission, and a different xPSS transmission and a different one of xSSS and xS-SCH transmission in which one of different xPSS codes and sequences represent different beamforming indexes.

In Example 17, the subject matter of any one or more of Examples 15-16 optionally include that the processing circuitry is further configured to: embed at least partial physical cell information in a sequence used for the one of the xSSS transmission and xS-SCH transmission.

In Example 18, the subject matter of any one or more of Examples 15-17 optionally include that the processing circuitry is further configured to: multiplex the xPSS transmission and at least one of a secondary synchronization signal (xSSS) transmission and a synchronization channel (xS-SCH) transmission using one of Frequency Division Multiplexing (FDM), Time Division Multiplexing (TDM) and Code Division Multiplexing (CDM).

In Example 19, the subject matter of any one or more of Examples 15-18 optionally include that a synchronization channel (xS-SCH) transmission comprises information for physical cell identity, beamforming index, time index function, system bandwidth, system frame number, TDD configuration information, scheduling information of system information block (SIB1), and the processing circuitry is further configured to: append a Cyclic Redundancy Check (CRC) comprising one of 8, 16 and 24 bits after a payload of the xS-SCH transmission, use one of tail biting convolutional codes (TBCC) and turbo code (TC) in channel coding of the xS-SCH transmission, perform rate matching after the channel coding to fill available resource elements allocated for the xS-SCH, scramble the xS-SCH transmission after performing the channel coding and rate-matching, and initialize a scrambling sequence based on a function of physical cell identification carried in the xPSS transmissions.

In Example 20, the subject matter of any one or more of Examples 15-19 optionally include that the processing circuitry is further arranged to: configure the transceiver to dynamically adjust an on/off pattern for the xPSS transmissions and at least one of a secondary synchronization signal (xSSS) transmission and a synchronization channel (xS-SCH) transmission in each cell based on load condition in the cell.

In Example 21, the subject matter of any one or more of Examples 15-20 optionally include that the processing circuitry is further arranged to at least one of: configure the transceiver to transmit: a fully loaded synchronization signal and channel transmission in which the xPSS transmissions and the at least one of the xSSS transmission and the xS-SCH transmission in different cells are different and are transmitted simultaneously, and an opportunistic synchronization signal and channel transmission in which the xPSS transmissions and the at least one of the xSSS transmission and the xS-SCH transmission in different cells are the same and are transmitted at non-overlapping times.

In Example 22, the subject matter of any one or more of Examples 15-21 optionally include that each xPSS transmission comprises a bandwidth less than a minimum system bandwidth and an xPSS transmission structure comprising a plurality (Nrep) of xPSS symbols each comprising an xPSS subcarrier spacing of K times a PSS subcarrier spacing of a PSS symbol and an xPSS duration of a PSS duration of the PSS symbol divided by K, where Nrep is an integer greater than 1, within the minimum system bandwidth, Power Spectral Density (PSD) subcarriers are employed for PSD boosting surround subcarriers of the xPSS transmission, andan element of the ZC sequence is punctured to avoid transmission on a Direct Current subcarrier disposed at a center of the xPSS transmission.

In Example 23, the subject matter of any one or more of Examples 21-22 optionally include that one of: a) a length of a Zadoff-Chu (ZC) sequence (NZC) that forms the xPSS transmission is less than a total number of subcarriers within an occupied bandwidth of the xPSS transmission (NPSS), and guard subcarriers disposed between the xPSS transmission and the PSD subcarriers between the PSD subcarriers and the xPSS transmission one of remain unused and carry a cyclic extension, and b) a length of the ZC sequence (NZC) is at least the total number of subcarriers within the occupied bandwidth of the xPSS transmission (NPSS), and at least one element in the ZC sequence is punctured for xPSS transmission symbol generation.

Example 24 is a computer-readable storage medium that stores instructions for execution by one or more processors of user equipment (UE) to communicate with an evolved NodeB (eNB), the one or more processors to configure the UE to: receive a primary synchronization signal (xPSS) transmission, and at least one of a secondary synchronization signal (xSSS) transmission and a synchronization channel (xS-SCH) transmission, the xPSS transmission comprising an xPSS structure comprising a repeated structure comprising a plurality (Nrep) of xPSS symbols each comprising an xPSS subcarrier spacing of K times a PSS subcarrier spacing of a PSS symbol and an xPSS transmission duration of a PSS duration of the PSS symbol divided by K, where Nrep is an integer greater than 1; obtain a physical layer cell identification and achieve synchronization with the eNB using the xPSS transmission and the at least one of the xSSS transmission and the xS-SCH transmission; and communicate with the eNB after synchronization is achieved with the eNB.

In Example 25, the subject matter of Example 24 optionally includes that each xPSS transmission comprises a bandwidth less than a minimum system bandwidth, and Power Spectral Density (PSD) subcarriers are employed for PSD boosting surround subcarriers of the xPSS transmission, an element of a Zadoff-Chu (ZC) sequence is punctured to avoid transmission on a Direct Current subcarrier disposed at a center of the xPSS transmission, and one of: a) a length of a Zadoff-Chu (ZC) sequence (NZC) that forms the xPSS transmission is less than a total number of subcarriers within an occupied bandwidth of the xPSS transmission (NPSS), and guard subcarriers disposed between the xPSS transmission and the PSD subcarriers between the PSD subcarriers and the xPSS transmission one of remain unused and carry a cyclic extension, b) a length of the ZC sequence (NZC) is at least the total number of subcarriers within the occupied bandwidth of the xPSS transmission (NPSS), and at least one element in the ZC sequence is punctured for xPSS transmission symbol generation.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE) comprising:
   at least one processor arranged to:
      decode, from a base station, a synchronization signal (SS) that comprise a primary synchronization signal (xPSS) transmission and a secondary synchronization signal (xSSS) and a physical broadcast channel (PBCH), each of the xPSS, xSSS and PBCH having symbol indexes dependent on a subcarrier spacing;
      determine a cell identification (ID), cell group ID and synchronization timing from the SS, the PBCH comprising a time index and a demodulation reference signal (DM-RS), the synchronization timing determined from the time index, the time index determined from the DM-RS; and
      synchronize with the base station using the SS.

2. The apparatus of claim 1, wherein:
   the PBCH is a synchronization channel (xS-SCH) transmission,
   the SS comprises one of: a plurality ($N_{rep}$) of xPSS symbols each comprising an xPSS subcarrier spacing an integer times a PSS subcarrier spacing and an xPSS duration the integer divided by a PSS duration, and an Interleaved Frequency Division Multiple Access (IF-DMA) structure comprising sets of xPSS symbols separated by non-xPSS symbols;
   the xPSS transmission comprises a bandwidth less than a minimum system bandwidth, within the minimum system bandwidth, Power Spectral Density (PSD) subcarriers are employed for PSD boosting surround subcarriers of the xPSS transmission, and if a length of a Zadoff-Chu (ZC) sequence ($N_{ZC}$) that forms the xPSS transmission is less than a total number of subcarriers within an occupied bandwidth of the xPSS transmission ($N_{PSS}$), at least one of: guard subcarriers disposed between the xPSS transmission and the PSD subcarriers remain unused between the PSD subcarriers and the xPSS transmission, or a cyclic extension of the $N_{ZC}$ that forms the xPSS transmission is disposed at one end of the xPSS transmission.

3. The apparatus of claim 2, wherein the xPSS transmission comprises at least one of:

a plurality ($N_{rep}$) of xPSS symbols each comprising an xPSS subcarrier spacing of K times a PSS subcarrier spacing of a PSS symbol and an xPSS duration of a PSS duration of the PSS symbol divided by K, where $N_{rep}$ is an integer greater than 1, or an IFDMA structure to generate repeated xPSS transmission symbols in a time domain, the xPSS symbols mapped to every K subcarriers in a frequency domain and remaining subcarriers are set to 0, where $K=2^N$ and N is an integer greater than 1.

4. The apparatus of claim 2, wherein:

if the cyclic extension of the ZC sequence forming the xPSS transmission is disposed at one end of the xPSS transmission, an element of the ZC sequence is punctured to avoid transmission on a Direct Current subcarrier disposed at a center of the xPSS transmission.

5. The apparatus of claim 2, wherein:

if the guard subcarriers disposed between the xPSS transmission and the PSD subcarriers remain unused between the PSD subcarriers and the xPSS transmission, the length of $N_{ZC}$ is less than $N_{PSS}$.

6. The apparatus of claim 2, wherein:

the length of $N_{ZC}$ is at least $N_{PSS}$, at least one element in $N_{ZC}$ is punctured for xPSS transmission symbol generation, and an element of $N_{ZC}$ is punctured to avoid transmission on a Direct Current subcarrier disposed at a center of the xPSS transmission.

7. The apparatus of claim 2, wherein:

a length of the CP is based on the xPSS duration, a total duration of the xPSS transmission, and which of an extended CP and a normal CP is used, and one of:

the CP is disposed in a first of the xPSS symbols and remaining xPSS transmission symbols in the xPSS transmission are free from the CP, or a CP is disposed in each of the xPSS symbols.

8. The apparatus of claim 2, wherein the at least one processor is further arranged to:

decode information regarding the xPSS transmission from a primary cell (Pcell) via UE-specific dedicated Radio Resource Control (RRC) signaling, the information including at least one of an indication of whether the xPSS transmission is one of a beam formed and a repeated xPSS transmission, an indication of whether PSD boosting is being used for the xPSS transmission, an indication of whether the CP is used for the xPSS transmission and a type of the CP, and a periodicity, an aggregation level (K) and a repetition level of the xPSS transmission.

9. The apparatus of claim 2, wherein the at least one processor is further arranged to:

decode a plurality of consecutively received xPSS transmissions and one of a xSSS and an xS-SCH transmission after the xPSS transmissions, or decode a plurality of consecutively received synchronization instances, each synchronization instance comprising an xPSS transmission and a secondary synchronization signal (xSSS) transmission and being free from a synchronization channel (xS-SCH) transmission.

10. The apparatus of claim 9, wherein:

if the synchronization instances comprise omnidirectional signals, each synchronization instances comprises:

a same xPSS transmission and a different one of xSSS and xS-SCH transmission, or a different xPSS transmission and a same one of xSSS and xS-SCH transmission, and if the synchronization instances comprise beamformed signals, each beamformed signal comprises:

a same xPSS transmission and a different one of xSSS and xS-SCH transmission, or a different xPSS transmission and a different one of xSSS and xS-SCH transmission.

11. An apparatus of a base station comprising:

at least one processor configured to, for each cell of a plurality of cells served by the base station:

encode a plurality of primary synchronization signal (xPSS) transmissions and one of a secondary synchronization signal (xSSS) and a synchronization channel (xS-SCH) transmission after the xPSS transmission within a subframe for the cell, each xPSS transmission comprising one of an omnidirectional xPSS transmission and a beamformed xPSS transmission; and encode and decode communications with the UE after transmission of the xPSS transmissions, wherein if the at least one processor is further configured encode a plurality of omnidirectional synchronization signal (xSS) transmissions and a beamformed xSS transmissions within the subframe, each xSS transmission, whether omnidirectional or beamformed, comprises a different combination of xPSS, xSSS and xS-SCH transmissions, in which at least one of the xPSS, xSSS and xS-SCH transmission is different in each xSS transmission.

12. The apparatus of claim 11, wherein the different combination s of xPSS, xSSS and xS-SCH transmissions comprise:

among omnidirectional xSS transmissions:

a same xPSS transmission and a different xSSS or xS-SCH transmission, or a different xPSS transmission and a same xSSS and xS-SCH transmission, and among beamformed signals:

a same xPSS transmission and a different xSSS or xS-SCH transmission, or a different xPSS transmission and a different xSSS and xS-SCH transmission in which one of different xPSS codes and sequences represent different beamforming indexes.

13. The apparatus of claim 11, wherein the at least one processor is further configured to:

embed at least partial physical cell information in a sequence used for the one of the xSSS transmission and xS-SCH transmission.

14. The apparatus of claim 11, wherein:

a synchronization channel (xS-SCH) transmission comprises information for physical cell identity, beamforming index, time index function, system bandwidth, system frame number, TDD configuration information, scheduling information of system information block (SIB 1), and the at least one processor is further configured to:
append a Cyclic Redundancy Check (CRC) comprising one of 8, 16 and 24 bits after a payload of the xS-SCH transmission,
use one of tail biting convolutional codes (TBCC) and turbo code (TC) in channel coding of the xS-SCH transmission,
perform rate matching after the channel coding to fill available resource elements allocated for the xS-SCH,
scramble the xS-SCH transmission after performing the channel coding and rate-matching, and
initialize a scrambling sequence based on a function of physical cell identification carried in the xPSS transmissions.

15. The apparatus of claim 11, wherein the at least one processor is further arranged to:
dynamically adjust an on/off pattern for the xPSS transmissions and at least one of a secondary synchronization signal (xSSS) transmission and a synchronization channel (xS-SCH) transmission in each cell based on load condition in the cell.

16. The apparatus of claim 11, wherein the at least one processor is further arranged to encode at least one of:
a fully loaded synchronization signal and channel transmission in which the xPSS transmissions and the at least one of the xSSS transmission and the xS-SCH transmission in different cells are different and are transmitted simultaneously, or
an opportunistic synchronization signal and channel transmission in which the xPSS transmissions and the at least one of the xSSS transmission and the xS-SCH transmission in different cells are the same and are transmitted at non-overlapping times.

17. The apparatus of claim 11, wherein:
each xPSS transmission comprises a bandwidth less than a minimum system bandwidth and an xPSS transmission structure comprising a plurality ($N_{rep}$) of xPSS symbols each comprising an xPSS subcarrier spacing of K times a PSS subcarrier spacing of a PSS symbol and an xPSS duration of a PSS duration of the PSS symbol divided by K, where $N_{rep}$ is an integer greater than 1, and K is an integer that represents an aggregation level, and
within the minimum system bandwidth, Power Spectral Density (PSD) subcarriers are employed for PSD boosting surround subcarriers of the xPSS transmission, and an element of the ZC sequence is punctured to avoid transmission on a Direct Current subcarrier disposed at a center of the xPSS transmission.

18. The apparatus of claim 17, wherein one of:
a) a length of a Zadoff-Chu (ZC) sequence ($N_{ZC}$) that forms the xPSS transmission is less than a total number of subcarriers within an occupied bandwidth of the xPSS transmission ($N_{PSS}$), and guard subcarriers disposed between the xPSS transmission and the PSD subcarriers between the PSD subcarriers and the xPSS transmission one of remain unused and carry a cyclic extension, and
b) a length of the ZC sequence ($N_{ZC}$) is at least the total number of subcarriers within the occupied bandwidth of the xPSS transmission ($N_{PSS}$), and at least one element in the ZC sequence is punctured for xPSS transmission symbol generation.

19. A non-transitory computer-readable storage medium that stores instructions for execution by one or more processors of user equipment (UE) to communicate with a base station, the one or more processors to configure the UE to:
receive a next generation primary synchronization signal (xPSS) transmission, and at least one of a secondary synchronization signal (xSSS) transmission and a synchronization channel (xS-SCH) transmission, the xPSS transmission comprising an xPSS structure comprising a repeated structure comprising a plurality ($N_{rep}$) of xPSS symbols each comprising an xPSS subcarrier spacing of K times a PSS subcarrier spacing of a PSS symbol and an xPSS transmission duration of a PSS duration of the PSS symbol divided by K, where $N_{rep}$ is an integer greater than 1 and K is an integer that represents an aggregation level;
obtain a physical layer cell identification and achieve synchronization with the base station using the xPSS transmission and the at least one of the xSSS transmission and the xS-SCH transmission; and
communicate with the base station after synchronization is achieved with the base station,
wherein each xPSS transmission comprises a bandwidth less than a minimum system bandwidth, and Power Spectral Density (PSD) subcarriers are employed for PSD boosting surround subcarriers of the xPSS transmission, and one of:
a) a length of a ZC sequence ($N_{ZC}$) that forms the xPSS transmission is less than a total number of subcarriers within an occupied bandwidth of the xPSS transmission ($N_{PSS}$), and guard subcarriers disposed between the xPSS transmission and the PSD subcarriers between the PSD subcarriers and the xPSS transmission one of remain unused and carry a cyclic extension, or
b) a length of $N_{ZC}$ is at least the total number of subcarriers within $N_{PSS}$, and at least one element in $N_{ZC}$ is punctured for xPSS transmission symbol generation to avoid transmission on a Direct Current subcarrier disposed at a center of the xPSS transmission.

20. The medium of claim 19, wherein the one or more processors further configure the UE to receive at least one of:
a fully loaded synchronization signal and channel transmission in which the xPSS transmissions and the at least one of the xSSS transmission and the xS-SCH transmission in different cells are different and are transmitted simultaneously, and
an opportunistic synchronization signal and channel transmission in which the xPSS transmissions and the at least one of the xSSS transmission and the xS-SCH transmission in different cells are the same and are transmitted at non-overlapping times.

* * * * *